(12) United States Patent
Mitsuiki et al.

(10) Patent No.: US 8,108,934 B2
(45) Date of Patent: Jan. 31, 2012

(54) INFORMATION PROCESSING APPARATUS AND METHOD, AND A PROGRAM

(75) Inventors: Kazutaka Mitsuiki, Tokyo (JP); Munetake Ebihara, Kanagawa (JP); Takuji Shimoda, Tokyo (JP); Nobuhisa Toshitani, Kanagawa (JP); Hideyuki Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 974 days.

(21) Appl. No.: 11/900,055

(22) Filed: Sep. 10, 2007

(65) Prior Publication Data

US 2008/0219442 A1    Sep. 11, 2008

(30) Foreign Application Priority Data

Sep. 11, 2006 (JP) .................................. 2006-246148

(51) Int. Cl.
*G06F 7/04* (2006.01)
*G06F 17/30* (2006.01)
(52) U.S. Cl. .......................................... 726/26; 380/201
(58) Field of Classification Search .................. 380/201; 726/33
See application file for complete search history.

(56) References Cited

U.S. PATENT DOCUMENTS

| | | |
|---|---|---|
| 6,658,247 B1 | 12/2003 | Saito |
| 2002/0099798 A1 | 7/2002 | Fedorovsky et al. |
| 2004/0117459 A1 | 6/2004 | Fry |
| 2005/0245243 A1 | 11/2005 | Zuniga |
| 2005/0281540 A1 | 12/2005 | Inokuchi et al. |
| 2006/0115241 A1* | 6/2006 | Saigo et al. ............ 386/124 |
| 2008/0162666 A1 | 7/2008 | Ebihara et al. |

FOREIGN PATENT DOCUMENTS

| | | |
|---|---|---|
| EP | 1300843 A2 | 4/2003 |
| EP | 1640889 A1 | 3/2006 |
| JP | 2001-256195 A | 9/2001 |
| JP | 2003-018461 A | 4/2003 |
| JP | 2004-178193 A | 6/2004 |
| JP | 2005-339514 A | 12/2005 |
| JP | 2006-004543 A | 1/2006 |
| JP | 2006-085479 A | 3/2006 |
| JP | 2006-107165 A | 4/2006 |
| JP | 2006-155403 A | 6/2006 |
| JP | 2006-216164 A | 8/2006 |
| WO | WO 01/67668 A1 | 9/2001 |
| WO | WO 2005/076140 A1 | 8/2005 |
| WO | WO 2005/101215 A1 | 10/2005 |

* cited by examiner

*Primary Examiner* — Christopher Brown
(74) *Attorney, Agent, or Firm* — Wolf, Greenfield & Sacks, P.C.

(57) ABSTRACT

Disclosed herein is an information processing apparatus that processes an encrypted content. The apparatus includes a control section configured to control the following processes, such as a generation process, a moving range determination process, a holding process, a copying process, and an inactivation process. Such processes are to be performed independently in a specified order as a process for achieving moving out of at least a part of the encrypted content from a moving source to a moving destination.

8 Claims, 13 Drawing Sheets

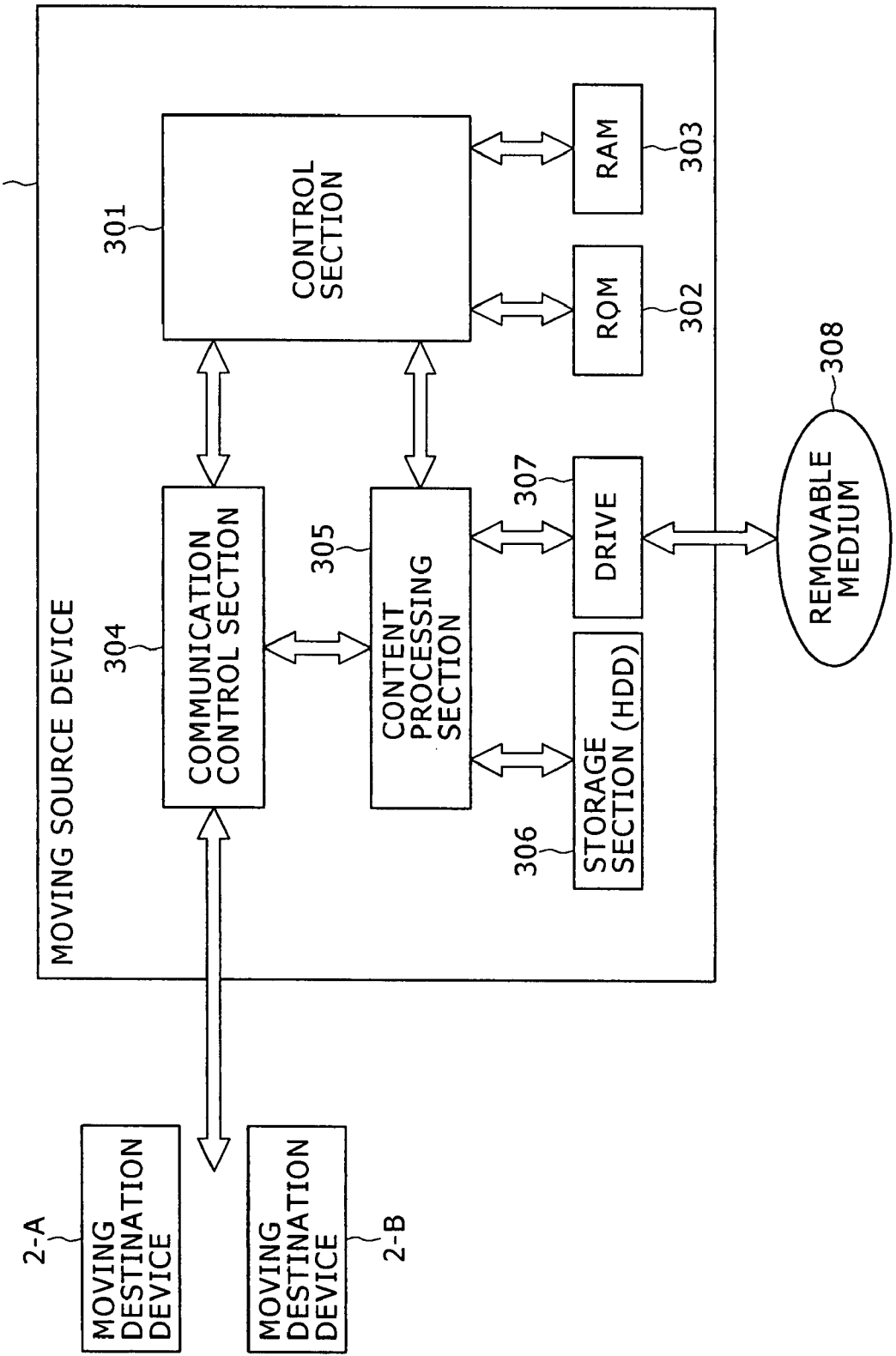

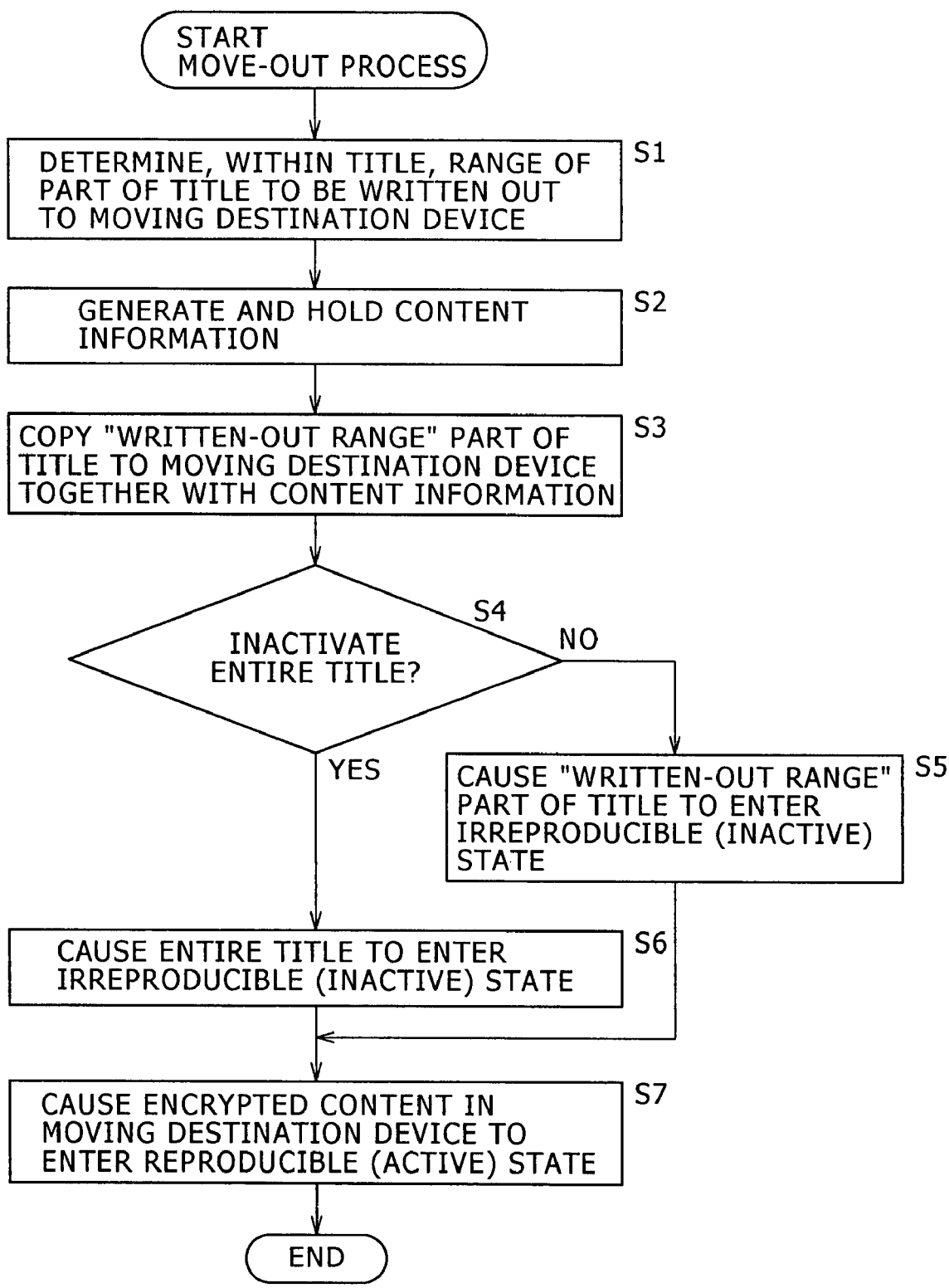

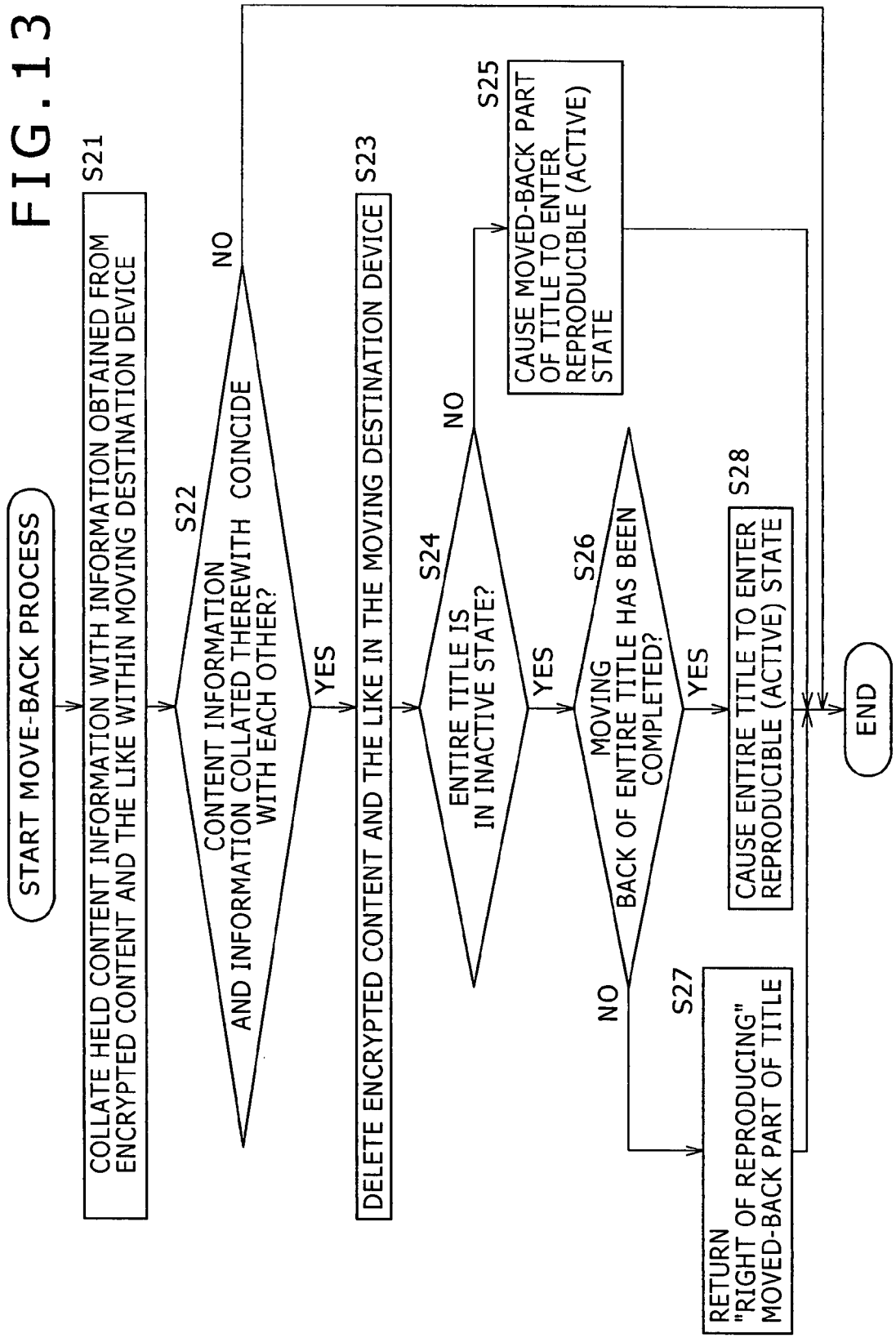

INFORMATION PROCESSING APPARATUS AND METHOD, AND A PROGRAM

CROSS REFERENCES TO RELATED APPLICATIONS

The present invention contains subject matter related to Japanese Patent Application JP 2006-246148, filed in the Japan Patent Office on Sep. 11, 2006, the entire contents of which being incorporated herein by reference.

BACKGROUND OF THE INVENTION

1. Field of the Invention

The present invention relates to an information processing apparatus and method, and a program therefor. In particular, the present invention relates to an information processing apparatus and method, and a program therefor which enable moving out and moving back of a part of a content with greatly simplified processing.

2. Description of the Related Art

In recent years, contents such as video, audio, and the like are widely used, and use of recording/reproduction apparatuses capable of recording and reproducing these contents as digital data is also spreading. For example, use of recording apparatuses capable of storing broadcast contents as digital data in a digital versatile disc (DVD) or a hard disc drive (HDD) is rapidly spreading. In addition, digital terrestrial broadcasting has recently been started after digital broadcasting that employs a broadcasting satellite. In such digital broadcasting, high definition television (HDV) video, which has a higher resolution than video that is broadcast in traditional broadcasting, is broadcast, and development of a recording apparatus that is capable of recording such a broadcast content on an optical disk or the like while maintaining picture quality thereof is advancing.

The term "content" refers to a variety of matters created by human creative activities. Examples of the contents include films, music, dramas, literature, photographs, comics, animation, computer games, other types of written, graphic, color-based, audio, motion-based, and video matters, a combination of the above, and a program for providing information related to the above via a computer. Note that, in the present specification, so-called content data, i.e., matters created by the human creative activities and converted by a device into a processible form, such as an electrical signal, or fixed on memory, for example, is also referred to as a content.

As described above, at present, it is easy to store high-quality contents in portable storage media. Accordingly, importance of protection of copyright of the contents is increasing. As a method for protecting copyright of video contents, a method of adding copy control information (CCI), which represents whether or not copying of a video content is possible, to the video content is normally employed at present. For example, use of the copy control information enables the video content to enter a Copy Free state, in which copying is not restricted, a Copy Once state, in which copying is permitted only once, a Copy Never state, in which copying is prohibited, or the like. In the current digital broadcasting mentioned above, copy control information representing "Copy Once" is added to all contents, and the recording apparatus normally causes such a content to enter the Copy Never state before recording the content on a storage medium.

A video content recorded on the storage medium after being caused to enter the Copy Never state is permitted to be copied to another storage medium on the condition that data of the video content be deleted from the storage medium. This operation of copying the data to the other storage medium while deleting the original data is called "Move". Thus, in the case where a video content has been received by the recording apparatus via digital broadcasting or the like and recorded on an HDD within the recording apparatus, for example, if a user desires to keep the video content for a long period of time, the user is able to move the video content to a removable medium such as a DVD. Thus, user convenience is improved while preventing unlawful production of copies in large quantities.

In general, the content to be moved is encrypted in a source from a moving source. Thereafter, the content encrypted (hereinafter referred to as the encrypted content) is copied to a moving destination together with information (hereinafter referred to as identification information) for identifying the encrypted content, e.g., information composed of key information for decrypting the encrypted content, a protected content ID, and the like.

Further, the encrypted content copied to the moving destination can be copied back to the moving source on the condition that the content be deleted from the moving destination. That is, a first moving, from the moving source to the moving destination, and a subsequent second moving, from the moving destination to the moving source, are possible. Hereinafter, the first moving and the second moving will be referred to as moving out and moving back, respectively.

As known apparatuses enabling moving out and moving back, apparatuses disclosed in Japanese Patent Laid-open No. 2006-4543 (US 2005-0281540 A1)(referred to as Patent Document 1 hereinafter) and Japanese Patent Laid-open No. 2006-107165 (referred to as Patent Document 2 hereinafter) can be cited, for example.

Known apparatuses, such as those disclosed in Patent Document 1 and Patent Document 2, have a problem in that in the case where an object to be moved is not the entire content but a part of the content, time-consuming processing may be required for both moving out and moving back.

This problem will now be described below with reference to FIGS. 1 to 3.

Referring to FIG. 1, it is assumed that, in a known moving source device 1, an encrypted content 11, which is a candidate for an object to be moved, and identification information 12 including key information A and a protected content ID are held in a single file.

In this case, although not shown, in the case where the object to be moved is the entire encrypted content 11, the moving source device 1 copies the encrypted content 11 as it is and the identification information 12 to a moving destination device 2-A or 2-B, and deletes the encrypted content 11 (i.e., the original data) and so on within itself, thereby completing moving out.

In contrast, in the case where the object to be moved is a part of the encrypted content 11 (hereinafter referred to as an encrypted part), specifically, in the case where, as illustrated in FIG. 2, an object to be moved to the moving destination device 2-A is an encrypted part 11-1 and an object to be moved to the moving destination device 2-B is an encrypted part 11-2, for example, moving out necessitates the following time-consuming series of processes.

That is, since direct extraction of the encrypted parts 11-1 and 11-2 from the encrypted content 11 is difficult, the moving source device 1 decrypts the entire encrypted content 11 using the key information A. As a result, the encrypted content 11 is converted back to a non-encrypted content.

The moving source device 1 extracts a non-encrypted part corresponding to the encrypted part 11-1 from the non-encrypted content, and re-encrypts the extracted non-encrypted part to generate an encrypted content 21-1. Thus, the new encrypted content 21-1 corresponding to the encrypted part 11-1 is generated. At the time of this re-encryption, an encryption key different from an encryption key used for the encrypted content 11 is used. Accordingly, the moving source device 1 generates key information B necessary for decrypting the encrypted content 21-1, i.e., key information B different from the key information A, and also generates a protected content ID for the encrypted content 21-1, thereby generating identification information 22 containing them. Thus, the new identification information 22 different from the identification information 12 is generated for the new encrypted content 21-1.

Then, the moving source device 1 copies the encrypted content 21-1 and the identification information 22 to the moving destination device 2-A.

Similarly, the moving source device 1 extracts a non-encrypted part corresponding to the encrypted part 11-2 from the non-encrypted content, and re-encrypts the extracted non-encrypted part to generate an encrypted content 21-2. Thus, the new encrypted content 21-2 corresponding to the encrypted part 11-2 is generated. At the time of this re-encryption, an encryption key different from the encryption keys used for the encrypted content 11 and the encrypted content 21-1 is used. Accordingly, the moving source device 1 generates key information C necessary for decrypting the encrypted content 21-2, i.e., key information C different from the key information A or B, and also generates a protected content ID for the encrypted content 21-2, thereby generating identification information 23 containing them. Thus, the new identification information 23 different from the identification information 12 or 22 is generated for the new encrypted content 21-2.

Then, the moving source device 1 copies the encrypted content 21-2 and the identification information 23 to the moving destination device 2-B.

As described above, in order to copy the encrypted part 11-1 (actually, the encrypted content 21-1) and the encrypted part 11-2 (actually, the encrypted content 21-2) to the moving destination device 2-A and the moving destination device 2-B, respectively, the time-consuming series of processes, i.e., the decryption of the encrypted content 11, the re-encryption for generating the new encrypted contents 21-1 and 21-2, and generation of the new identification information 22 and 23, may be required.

In addition, in order to complete the moving out, deletion of the original data in the moving source device 1, i.e., deletion of the encrypted parts 11-1 and 11-2, may be required. This deletion necessitates the following time-consuming processes. That is, the moving source device 1 deletes the new encrypted contents 21-1 and 21-2. In addition, the moving source device 1 re-encrypts a non-encrypted part that is not the object of moving among the non-encrypted content using the encryption key corresponding to the key information A to generate an encrypted part 11-3, and holds the generated encrypted part 11-3 in the original file so as to be associated with the identification information 12. As a result of the above series of processes, a process equivalent to the deletion of the encrypted parts 11-1 and 11-2 is completed.

The moving out of the encrypted part 11-1 to the moving destination device 2-A and the moving out of the encrypted part 11-2 to the moving destination device 2-B are completed after the above time-consuming series of processes are performed.

As illustrated in FIG. 3, when moving back of the encrypted content 21-1 from the moving destination device 2-A to the moving source device 1 has been performed, the encrypted content 21-1 is held, in the moving source device 1, in a file different from the file of the original encrypted content 11, i.e., the file in which the encrypted part 11-3 is stored at the time of the moving back. Similarly, when moving back of the encrypted content 21-2 from the moving destination device 2-B to the moving source device 1 has been performed, the encrypted content 21-2 is held, in the moving source device 1, in a file different from the file of the original encrypted content 11, i.e., the file in which the encrypted part 11-3 is stored at the time of the moving back.

However, completion of the moving back from the moving destination devices 2-A and 2-B to the moving source device 1 means that a state as illustrated in FIG. 1 is achieved again; that is, reconstruction of the encrypted content 11 and storage thereof in the original file is necessary.

The reconstruction of the encrypted content 11 necessitates the following time-consuming processes.

That is, the moving source device 1 decrypts the encrypted part 11-3 using the key information A. The moving source device 1 also decrypts the encrypted content 21-1 corresponding to the encrypted part 11-1 using the key information B. The moving source device 1 also decrypts the encrypted content 21-2 corresponding to the encrypted part 11-2 using the key information C.

Next, the moving source device 1 combines the three non-encrypted parts obtained by the above three decryption processes to generate a non-encrypted content.

Next, the moving source device 1 re-encrypts the generated non-encrypted content using the encryption key corresponding to the key information A to reconstruct the encrypted content 11.

Then, the moving source device 1 holds the reconstructed encrypted content 11 in the original file so as to be associated with the identification information 12.

After the above time-consuming series of processes are performed, the state illustrated in FIG. 1 is achieved again, and the moving back from the moving destination devices 2-A and 2-B to the moving source device 1 is completed.

SUMMARY OF THE INVENTION

The present invention enables moving out and moving back of a part of a content with greatly simplified processing.

According to one embodiment of the present invention, there is provided an information processing apparatus that processes an encrypted content and which includes a control section configured to control the following processes to be performed independently in a specified order as a process for achieving moving out of at least a part of the encrypted content from a moving source to a moving destination: a generation process of generating the encrypted content composed of a plurality of encrypted content units to which different serial numbers are assigned, and generating, as identification information, data necessary for identifying and making reproducible the encrypted content; a moving range determination process of determining, within the encrypted content generated by the generation process, a moving object range composed of one or more of the encrypted content units; a holding process of holding, as content information, a pair of serial number information representing serial numbers assigned to the one or more of the encrypted content units contained in the moving object range determined by the moving range determination process and the identification information generated by the generation process in the moving source; a copying process of copying a part of the encrypted content generated by the generation process that corresponds to the moving object range determined by the moving range determination process to the moving destination together with the identification information generated by the generation process; and an inactivation process of causing at least the part of the encrypted content generated by the generation process that corresponds to the moving object range determined by the moving range determination process to enter an inactive state in the moving source.

As control of the inactivation process, the control section may control only the part of the encrypted content generated by the generation process that corresponds to the moving object range determined by the moving range determination process to enter the inactive state in the moving source.

The control section may further control the following processes to be performed independently in a specified order as a process for achieving moving back from the moving destination to the moving source: a collation process of collating the content information held in the moving source by the holding process with information obtained from the encrypted content and the identification information in the moving destination; a deletion process of deleting the encrypted content and the identification information from the moving destination after the collation is successfully completed by the collation process; and an activation process of, after the collation is successfully completed by the collation process, causing a part of the encrypted content generated by the generation process that corresponds to the encrypted content in the moving destination to enter an active state in the moving source.

As control of the inactivation process, the control section may control the entire encrypted content generated by the generation process to enter the inactive state in the moving source.

The control section may further control the following processes to be performed independently in a specified order as a process for achieving moving back from the moving destination to the moving source: a collation process of collating the content information held in the moving source by the holding process with information obtained from the encrypted content and the identification information in the moving destination; a deletion process of deleting the encrypted content and the identification information from the moving destination after the collation is successfully completed by the collation process; and an activation process of, after the collation is successfully completed by the collation process, causing the entire encrypted content generated by the generation process to enter the active state in the moving source if moving back of the encrypted content in the moving destination results in completion of moving back of the entire encrypted content generated by the generation process, but otherwise returning a right of reproducing the part of the encrypted content generated by the generation process that corresponds to the encrypted content in the moving destination.

The inactive state may be an irreproducible state.

According to one embodiment of the present invention, there is provided an information processing method employed by an information processing apparatus that processes an encrypted content, for achieving moving out of at least a part of the encrypted content from a moving source to a moving destination, the method including the steps of: generating the encrypted content composed of a plurality of encrypted content units to which different serial numbers are assigned, and generating, as identification information, data necessary for identifying and making reproducible the encrypted content; determining, within the encrypted content generated in the generating step, a moving object range composed of one or more of the encrypted content units; holding, as content information, a pair of serial number information representing serial numbers assigned to the one or more of the encrypted content units contained in the moving object range determined in the determining and the identification information generated in the generating step in the moving source; copying a part of the encrypted content generated in the generating step that corresponds to the moving object range determined in the determining step to the moving destination together with the identification information generated in the generating step; and causing at least the part of the encrypted content generated in the generating step that corresponds to the moving object range determined in the determining step to enter an inactive state in the moving source, wherein the information processing apparatus executes processes of the above steps for achieving the moving out independently in a specified order.

According to one embodiment of the present invention, there is provided a program corresponding to the above information processing method according to one embodiment of the present invention.

In the information processing apparatus and method, and the program according to one embodiment of the present invention, the following processes are performed independently in a specified order as a move-out process for achieving moving out of at least a part of an encrypted content from a moving source to a moving destination: a generation process of generating the encrypted content composed of a plurality of encrypted content units to which different serial numbers are assigned, and generating, as identification information, data necessary for identifying and making reproducible the encrypted content; a moving range determination process of determining, within the encrypted content generated by the generation process, a moving object range composed of one or more of the encrypted content units; a holding process of holding, as content information, a pair of serial number information representing serial numbers assigned to the one or more of the encrypted content units contained in the moving object range determined by the moving range determination process and the identification information generated by the generation process in the moving source; a copying process of copying a part of the encrypted content generated by the generation process that corresponds to the moving object range determined by the moving range determination process to the moving destination together with the identification information generated by the generation process; and an inactivation process of causing at least the part of the encrypted content generated by the generation process that corresponds to the moving object range determined by the moving range determination process to enter an inactive state in the moving source.

As described above, according to one embodiment of the present invention, moving out and moving back of a part of a content are achieved. In particular, processing at that time is greatly simplified compared to known techniques.

BRIEF DESCRIPTION OF THE DRAWINGS

FIG. 11 is a diagram illustrating an exemplary structure of a moving source device, i.e., an information processing apparatus according to one embodiment of the present invention;

FIG. 12 is a flowchart illustrating an example of a move-out process performed by the moving source device of FIG. 11; and FIG. 13 is a flowchart illustrating an example of a move-back process performed by the moving source device of FIG. 11.

DETAILED DESCRIPTION OF THE PREFERRED EMBODIMENTS

Hereinafter, embodiments of the present invention will be described. Correspondence between the constituent features of the present invention and the embodiments that will be described in this specification taken in conjunction with the accompanying drawings is exemplified as follows. Note that this preliminary description is meant to confirm that an embodiment that supports the present invention is described in this specification and the accompanying drawings. Therefore, even if there is an embodiment that is described in this specification and the accompanying drawings but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

Figure 7:
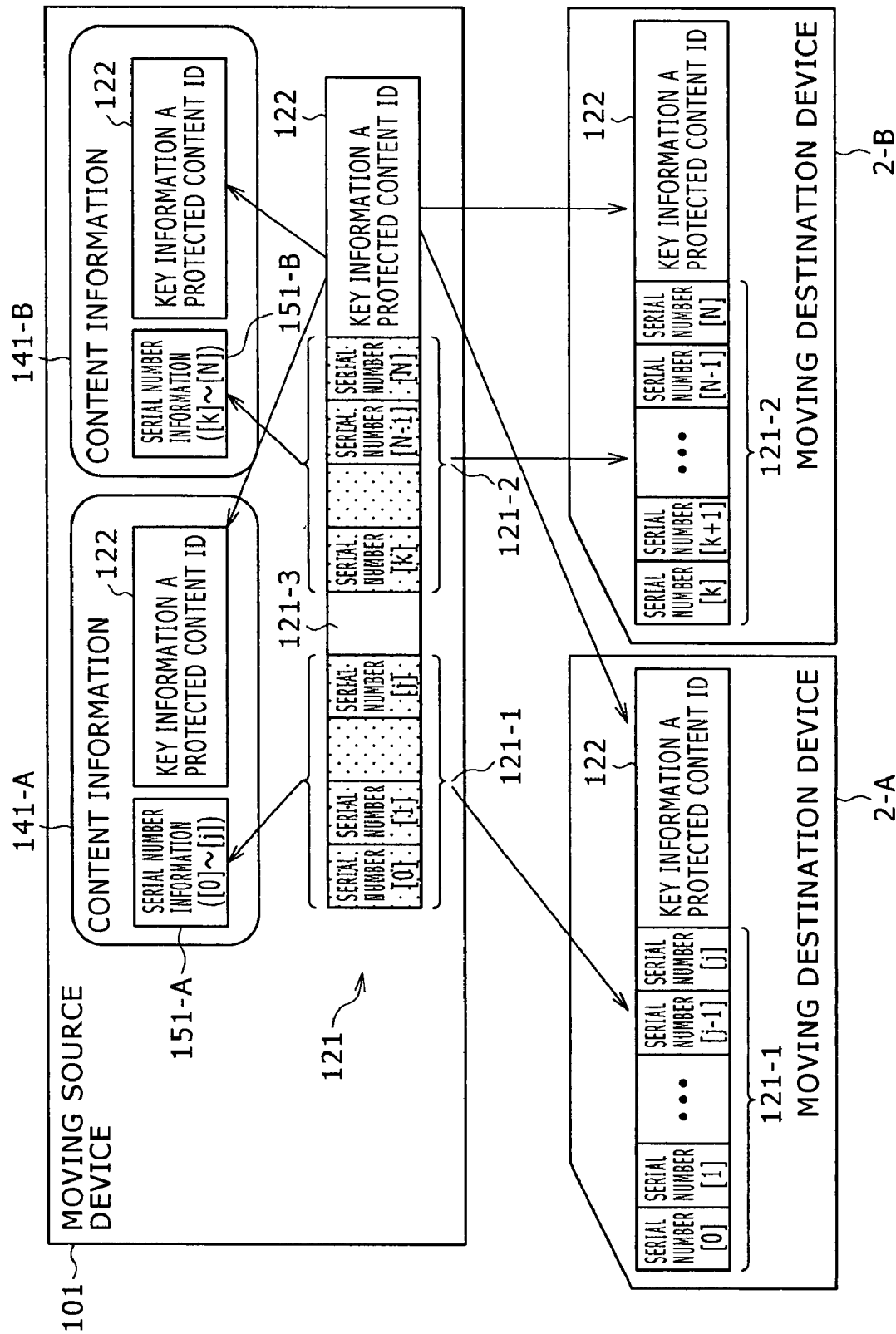

An information processing apparatus (e.g., a moving source device 101 in FIG. 11) according to one embodiment of the present invention is an information processing apparatus that processes an encrypted content, the apparatus including a control section (e.g., a control section 301 in FIG. 11) configured to control the following processes to be performed independently in a specified order as a process for achieving moving out of at least a part of the encrypted content from a moving source (e.g., a storage section 306 or the like of the moving source device 101 in FIG. 11) to a moving destination (e.g., a moving destination device 2-A or 2-B in FIG. 11): a generation process of generating the encrypted content (e.g., an encrypted content 121 in FIG. 4) composed of a plurality of encrypted content units to which different serial numbers are assigned (in the case of FIG. 4, for example, encrypted content units 131-k to which serial numbers [k] are assigned), and generating, as identification information (e.g., identification information 122 in FIG. 4), data necessary for identifying and making reproducible the encrypted content; a moving range determination process of determining, within the encrypted content generated by the generation process, a moving object range composed of one or more of the encrypted content units (in the case of FIG. 7, for example, a moving object range for the moving destination device 2-A is an encrypted part 121-1, and a moving object range for the moving destination device 2-B is an encrypted part 121-2); a holding process of holding, as content information (in the case of FIG. 7, for example, content information 141-A composed of serial number information 151-A and the identification information 122, and content information 141-B composed of serial number information 151-B and the identification information 122), a pair of serial number information representing serial numbers assigned to the one or more of the encrypted content units contained in the moving object range determined by the moving range determination process and the identification information generated by the generation process in the moving source; a copying process of copying a part of the encrypted content generated by the generation process that corresponds to the moving object range determined by the moving range determination process to the moving destination together with the identification information generated by the generation process (in the case of FIG. 7, for example, a process of copying a pair of the encrypted part 121-1 and the identification information 122 to the moving destination device 2-A, and copying a pair of the encrypted part 121-2 and the identification information 122 to the moving destination device 2-B); and an inactivation process of causing at least the part of the encrypted content generated by the generation process that corresponds to the moving object range determined by the moving range determination process to enter an inactive state in the moving source (in the case of FIG. 7, for example, a process of causing the encrypted part 121-1 and the encrypted part 121-2 to enter an inactive state. Note that, in FIG. 7, the inactive state is indicated by gray while an active state is indicated by white).

As control of the inactivation process, the control section may control only the part of the encrypted content generated by the generation process that corresponds to the moving object range determined by the moving range determination process to enter the inactive state in the moving source (e.g., a process of step S5 in FIG. 12).

Figure 8:
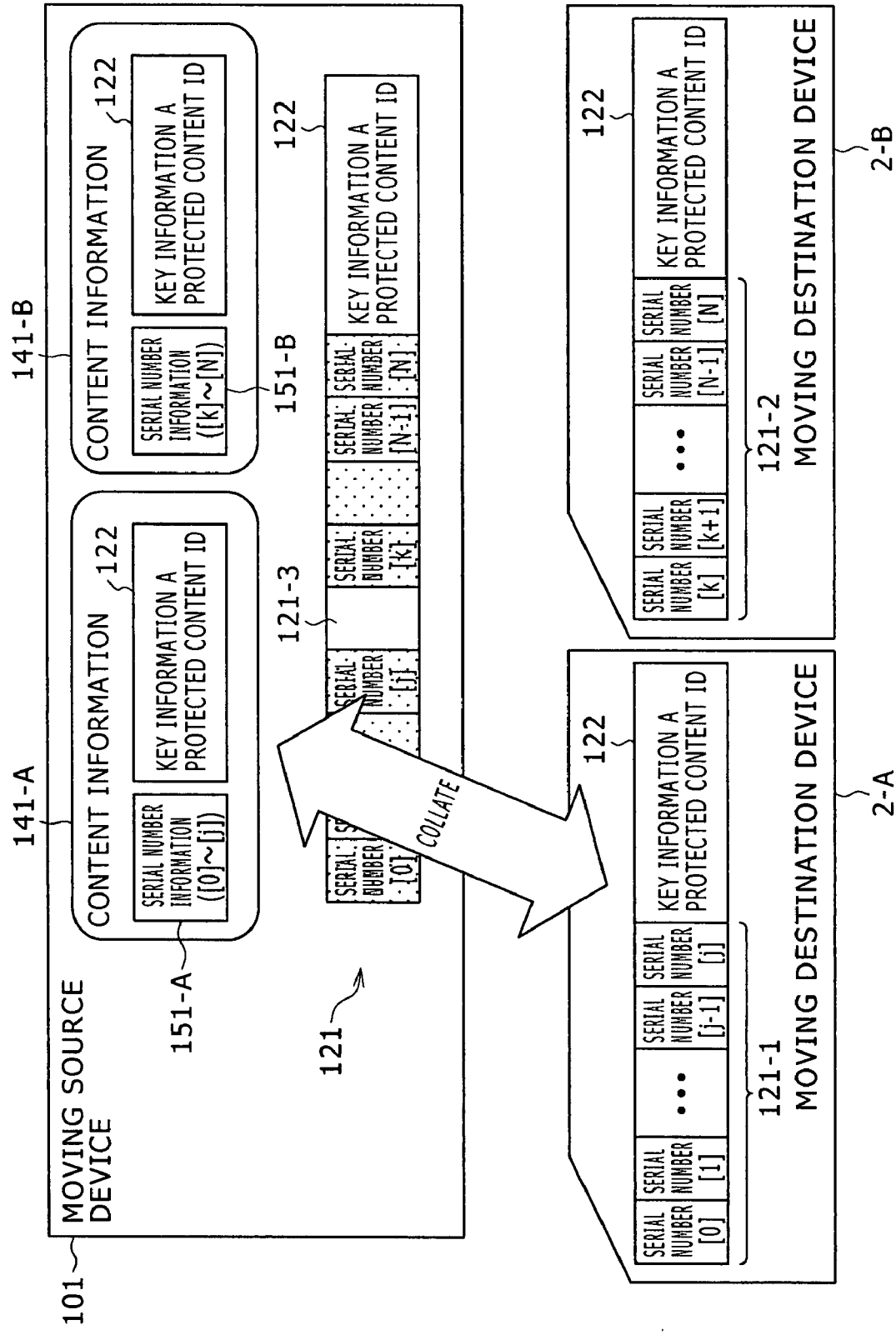
FIGS. 8 to 10 are diagrams illustrating examples of moving back according to an inventive technique.
Figure 9:
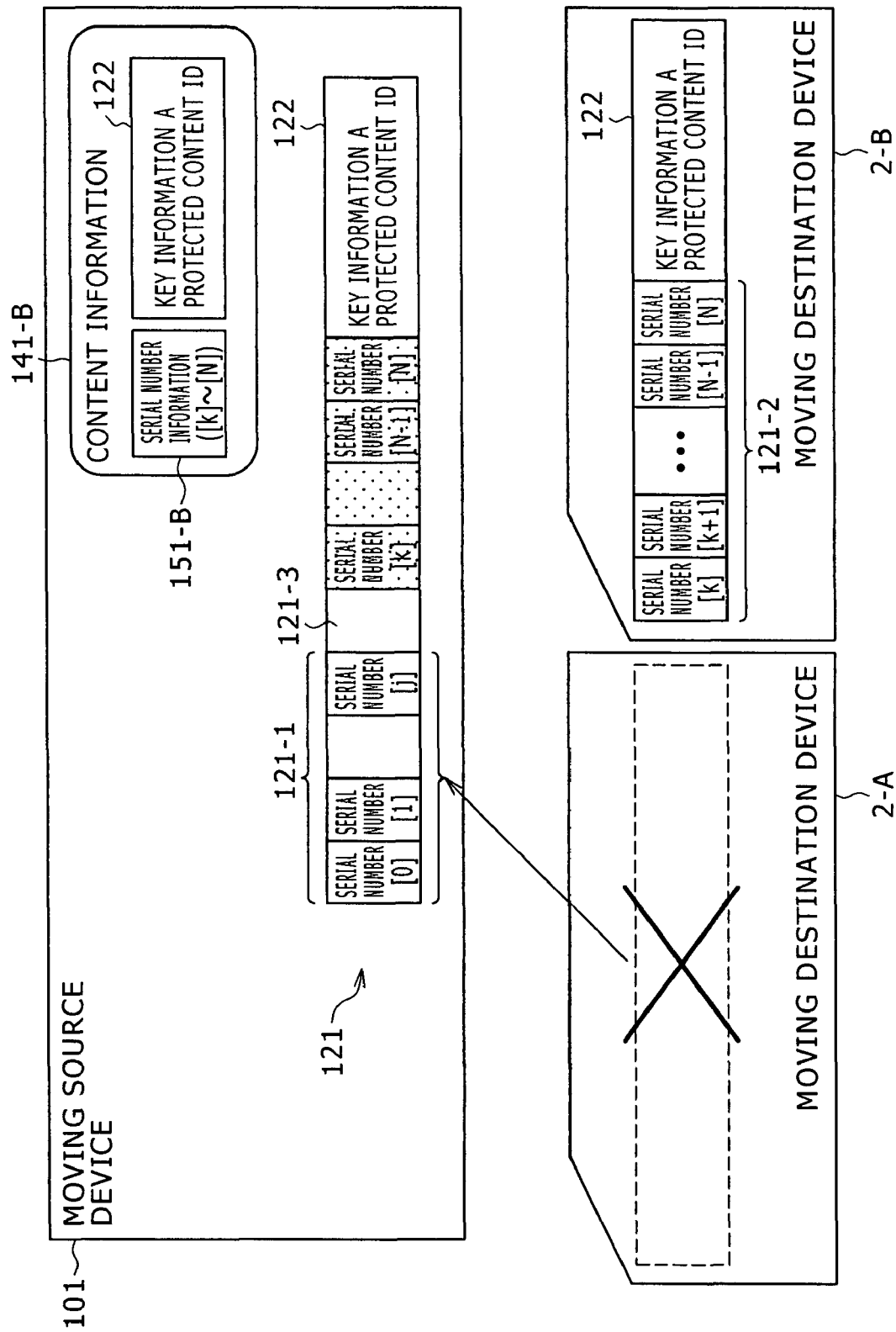

The control section may further control the following processes to be performed independently in a specified order as a process for achieving moving back from the moving destination to the moving source: a collation process of collating the content information held in the moving source by the holding process with information obtained from the encrypted content and the identification information in the moving destination (e.g., processes of steps S21 and S22 in FIG. 13, and specifically, a process indicated by a white arrow in FIG. 8, for example); a deletion process of deleting the encrypted content and the identification information from the moving destination after the collation is successfully completed by the collation process (e.g., a process of step S23 in FIG. 13, and specifically, a process indicated by a cross in FIG. 9, for example); and an activation process of, after the collation is successfully completed by the collation process, causing a part of the encrypted content generated by the generation process that corresponds to the encrypted content in the moving destination to enter an active state in the moving source (e.g., a process of step S25 in FIG. 13, and specifically, a process indicated by the change in color of the encrypted part 121-1 from gray, as in FIG. 8, to white, as in FIG. 9).

As control of the inactivation process, the control section may control the entire encrypted content generated by the generation process to enter the inactive state in the moving source (e.g., a process of step S6 in FIG. 12).

Figure 10:
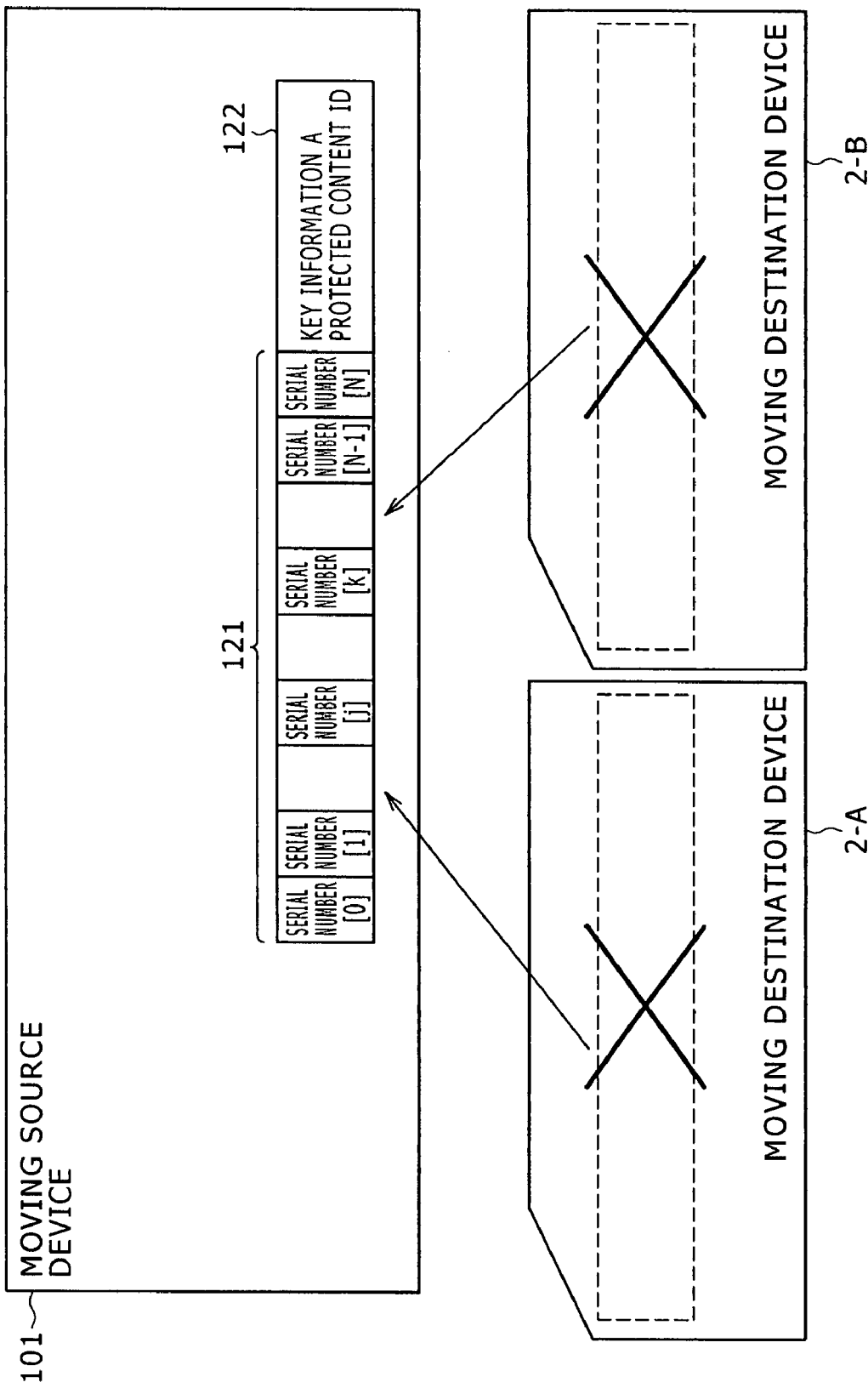

The control section may further control the following processes to be performed independently in a specified order as a process for achieving moving back from the moving destination to the moving source: a collation process of collating the content information held in the moving source by the holding process with information obtained from the encrypted content and the identification information in the moving destination (e.g., the processes of steps S21 and S22 in FIG. 13, and specifically, the process indicated by the white arrow in FIG. 8, for example); a deletion process of deleting the encrypted content and the identification information from the moving destination after the collation is successfully completed by the collation process (e.g., the process of step S23 in FIG. 13, and specifically, a process indicated by a cross in FIG. 10, for example); and an activation process of, after the collation is successfully completed by the collation process, causing the entire encrypted content generated by the generation process to enter the active state in the moving source if moving back of the encrypted content in the moving destination results in completion of moving back of the entire encrypted content generated by the generation process, but otherwise returning a right of reproducing the part of the encrypted content generated by the generation process that corresponds to the encrypted content in the moving destination (e.g., processes of steps S26 to S28 in FIG. 13, and a process illustrated in FIG. 10).

An information processing method according to one embodiment of the present invention is an information processing method employed by an information processing apparatus (e.g., the moving source device 101 in FIG. 11) that processes an encrypted content, for achieving moving out of at least a part of the encrypted content from a moving source to a moving destination, the method including the steps of: generating the encrypted content composed of a plurality of encrypted content units to which different serial numbers are assigned, and generating, as identification information, data necessary for identifying and making reproducible the encrypted content (e.g., a process illustrated in FIG. 4); determining, within the encrypted content generated in the generating step, a moving object range composed of one or more of the encrypted content units (e.g., a process of step S1 in FIG. 12); holding, as content information, a pair of serial number information representing serial numbers assigned to the one or more of the encrypted content units contained in the moving object range determined in the determining step and the identification information generated in the generating step in the moving source (e.g., a process of step S2 in FIG. 12); copying a part of the encrypted content generated in the generating step that corresponds to the moving object range determined in the determining step to the moving destination together with the identification information generated in the generating step (e.g., a process of step S3 in FIG. 12); and causing at least the part of the encrypted content generated in the generating step that corresponds to the moving object range determined in the determining step to enter an inactive state in the moving source (e.g., processes of steps S4 to S6 in FIG. 12), wherein the information processing apparatus executes processes of the above steps for achieving the moving out independently in a specified order.

A program according to one embodiment of the present invention is, for example, a program for causing the steps of the above-described information processing method according to one embodiment of the present invention to be performed, and this program is executed by a computer that includes the control section 301 in FIG. 11, for example.

First, with reference to FIGS. 4 to 10, outlines of techniques of moving out and moving back according to an embodiment of the present invention will be described. (These techniques will hereinafter be referred to as inventive techniques.)

Figure 1:
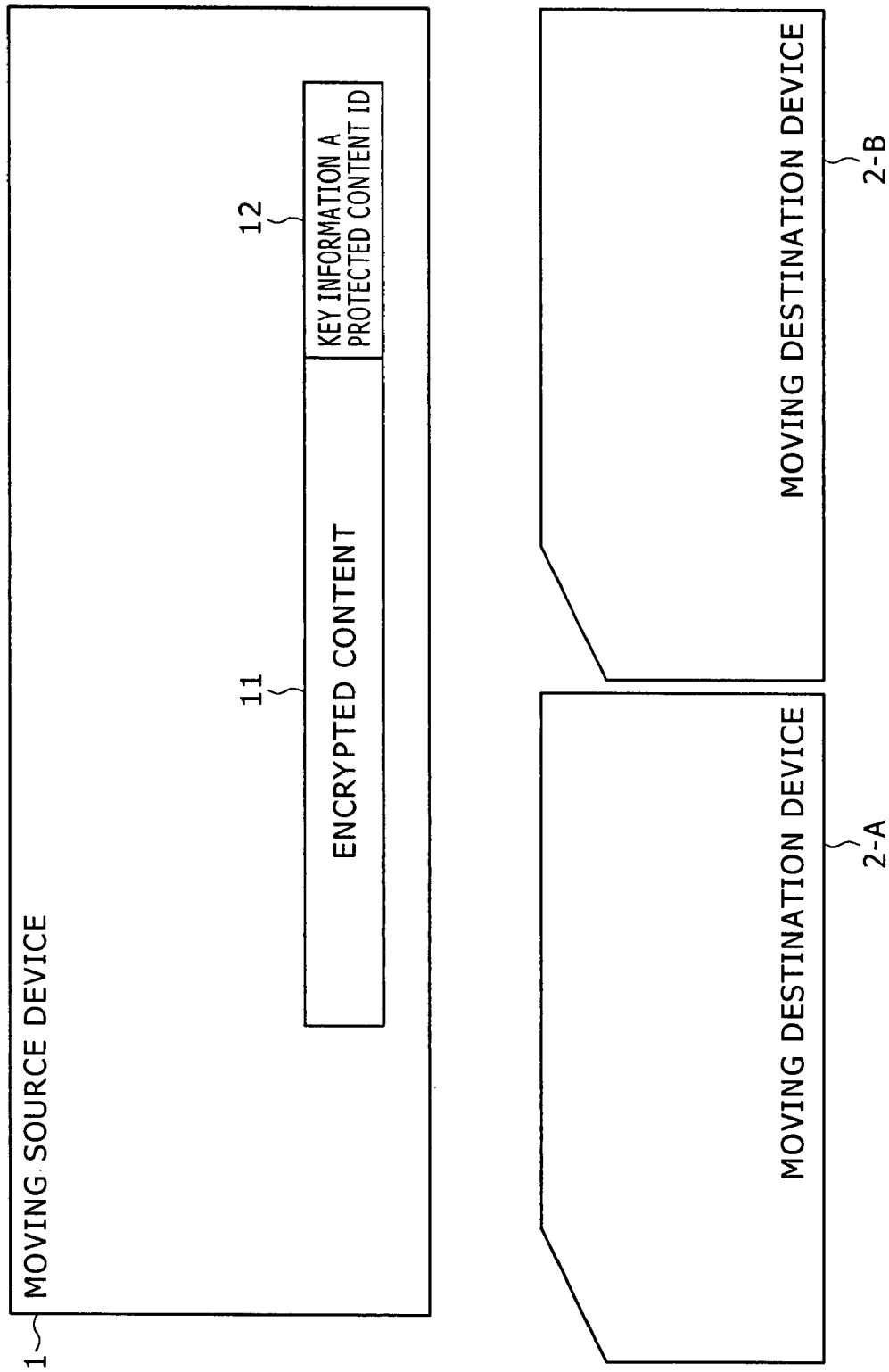
FIGS. 1 and 2 are diagrams illustrating moving out according to a known technique.

In FIGS. 4 to 10, a moving source device 101 different from the known moving source device 1 (see FIG. 1) is adopted as a moving source device. That is, the moving source device 101 is a moving source device to which the inventive techniques are applied. In other words, the moving source device 101 is an information processing apparatus according to one embodiment of the present invention. A specific exemplary structure of and exemplary processing by the moving source device 101 will be described later with reference to FIGS. 11 to 13. In contrast, known moving destination devices 2-A and 2-B are adopted as moving destination devices. Note that the known moving destination devices 2-A and 2-B are adopted simply in order to facilitate comparison of the inventive techniques with known techniques, and that, naturally, the moving destinations are not limited to the known moving destination devices 2-A and 2-B, but another information processing apparatuses according to an embodiment of the present invention or a given storage medium, for example, may also be adopted as the moving destination.

Figure 4:
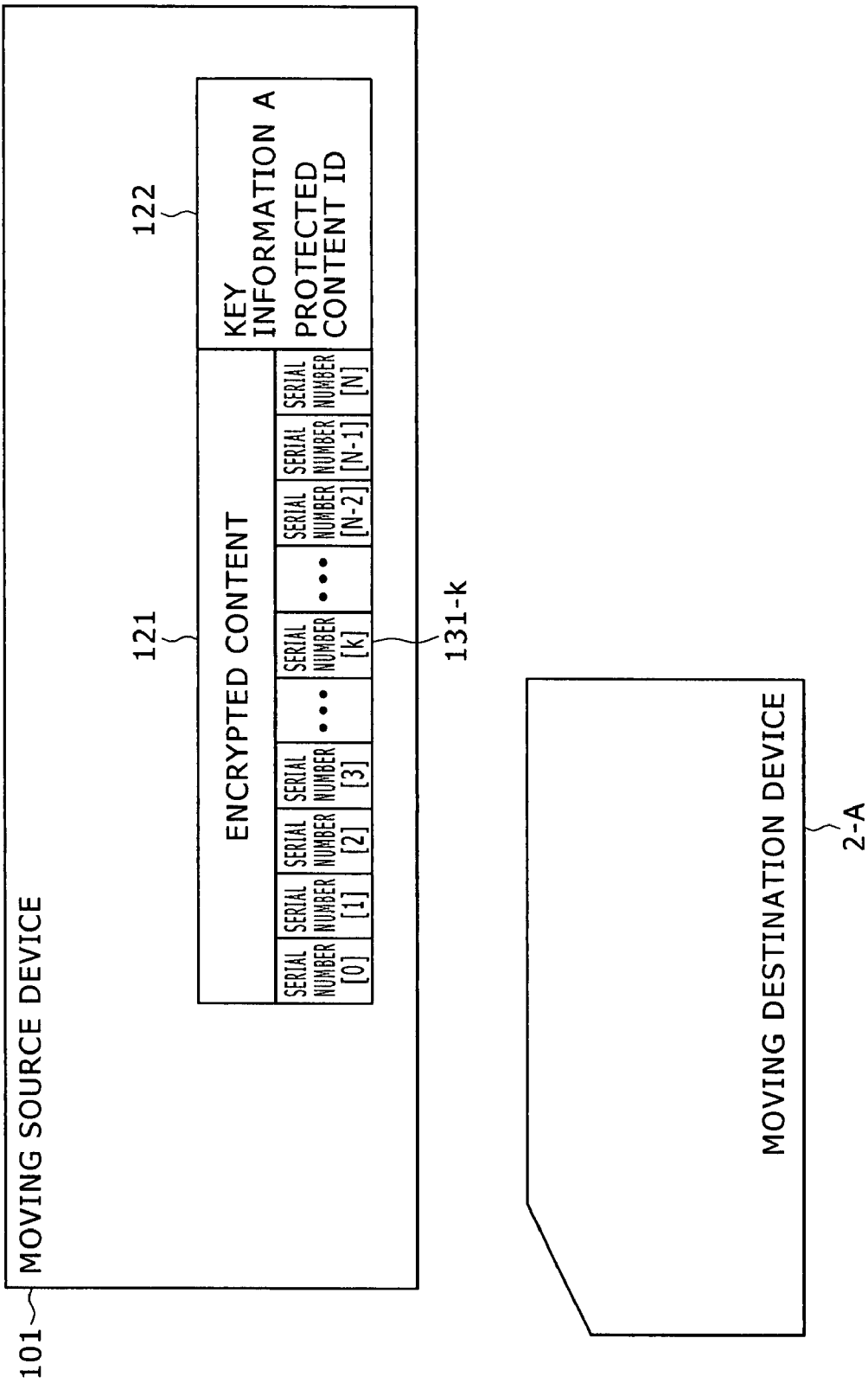
FIG. 4 is a diagram illustrating an example of an object of moving according to an inventive technique.

It is assumed in the inventive techniques that a state illustrated in FIG. 4 is an initial state.

Specifically, before performing moving out, the moving source device 101 encrypts a content that is a candidate for moving according to an "encryption system in which encryption involves assignment of serial number information" to generate an encrypted content 121 composed of a series of N+1 (N is an integer of 1 or more) encrypted content units 131-$k$ ($k$ is an integer of 0 to N) each assigned with a serial number [$k$].

Here, the "encryption system in which encryption involves assignment of serial number information" refers to a system in which a content is segmented into N+1 content units, the N+1 content units are encrypted sequentially, and serial numbers of 0 to N+1 are assigned to the resulting N+1 encrypted content units. Any encryption key can be used in this system as long as the encrypted content units can be decrypted independently of each other. For example, the same key may be used for all the partial contents, or alternatively, different partial contents may be encrypted using different keys associated with the serial numbers.

Thus, it is assumed in the example of FIG. 4 that key information A and the serial numbers [$k$] are used so that each of the encrypted content units 131-$k$ can be decrypted independently of each other.

That is, in the inventive techniques, the initial state is assumed to be a state in which the encrypted content 121 composed of the collection of the above encrypted content units 131-0 to 131-N is held, in a moving source as the candidate for moving, in the same file as that of identification information 122 that includes the key information A and a protected content ID.

Here, as described below, the moving source may be either a storage medium (e.g., a hard disk) contained in the moving source device 101 or a storage medium (e.g., a removable medium) external to the moving source device 101. Note that, hereinafter, in order to simplify the description, the file being held in the moving source, which comprehends the file being held in the storage medium external to the moving source device 101, will be referred to as the file being held in the moving source device 101.

According to the inventive technique, when starting from the initial state, at least a part of the encrypted content 121 is moved out as an object of moving, information (hereinafter referred to as content information) for identifying the object of moving at the time of moving back is held in the moving source device 101.

Specifically, in the inventive technique, it is assumed that the unit of moving out is the encrypted content unit 131-$k$, taking advantage of the fact that each of the encrypted content units 131-$k$ can be decrypted independently of each other. In this case, one or more of the encrypted content units 131-$k$ can be the object of moving; and information (hereinafter referred to as serial number information) representing each of the serial numbers $k$ assigned to the one or more of the encrypted content units 131-$k$ and the identification information 122 for the original encrypted content 121 suffice to identify the one or more of the encrypted content units 131-$k$. Therefore, content information composed of the serial number information and the identification information 122 is held in the moving source device 101.

Figure 5:
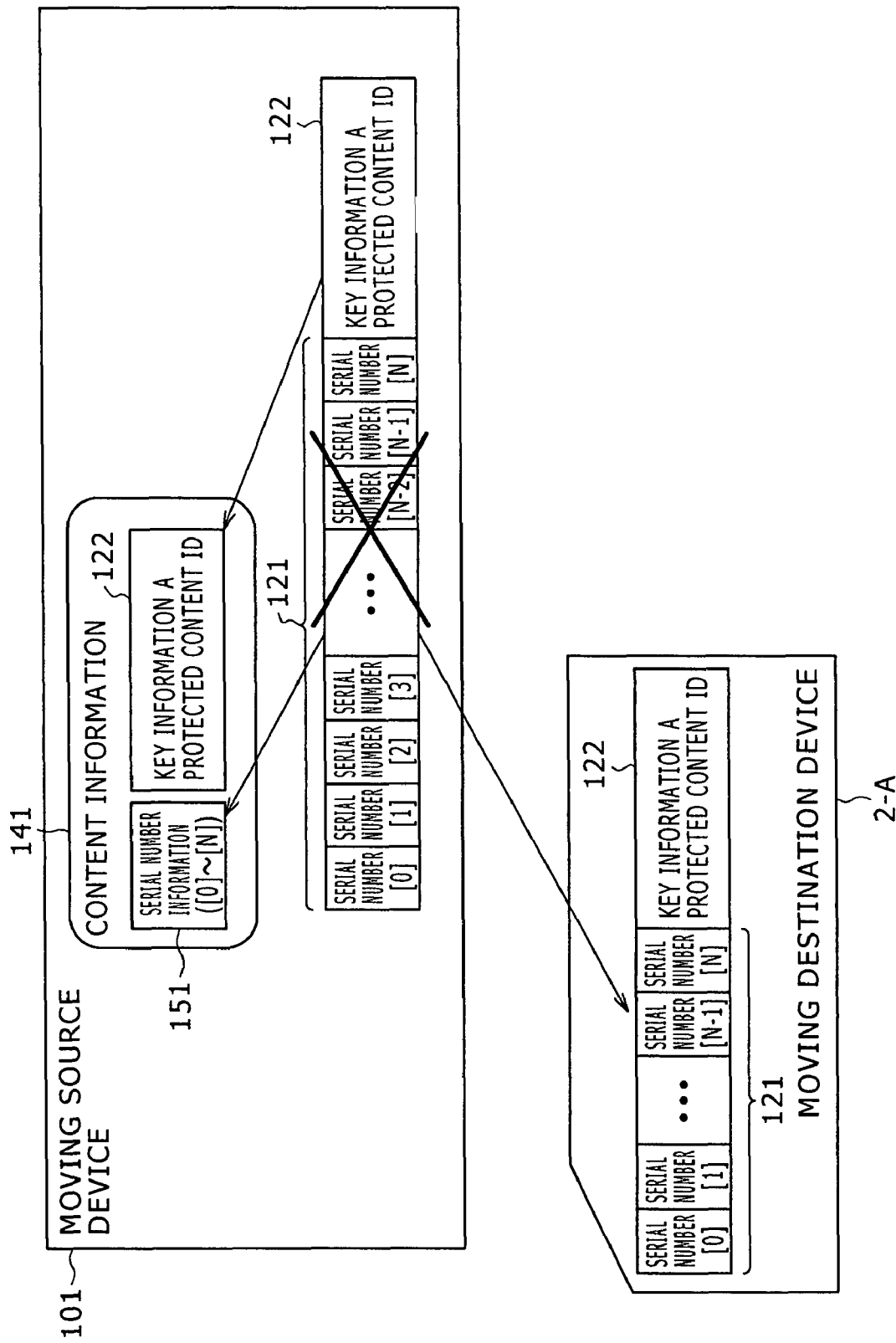
FIGS. 5 to 7 are diagrams illustrating examples of moving out according to an inventive technique.

Specifically, referring to FIG. 5, in the case where the object of moving is the entire encrypted content 121, for example, the moving source device 101 copies the encrypted content 121 as it is to the moving destination device 2-A together with the identification information 122, and deletes the encrypted content 121, which is the original data, within itself. At this time, the moving source device 101 generates content information 141 composed of serial number information 151 representing the serial numbers [0] to [N] and the identification information 122, and holds the generated content information 141 within itself. Thus, the moving out is completed.

Meanwhile, in the case where the object of moving is a part of the encrypted content 121 (hereinafter referred to as an encrypted part), for example, referring to FIG. 6, in the case where the object of moving for the moving destination device 2-A is an encrypted part 121-1 and the object of moving for the moving destination device 2-B is an encrypted part 121-2, moving out is completed only by performing a simple process described below.

Figure 6:
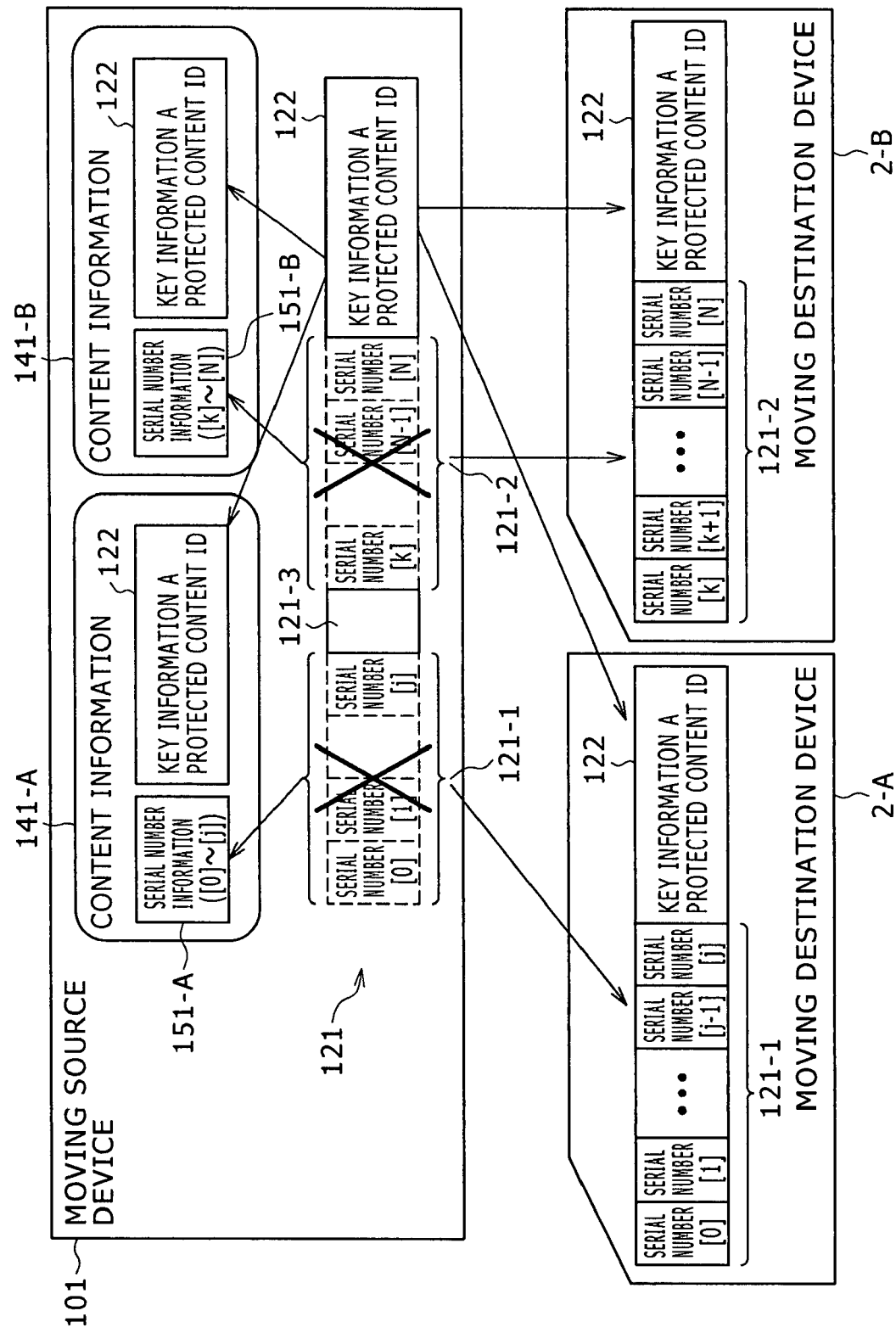

As illustrated in FIG. 6, the encrypted part 121-1 is a collection of the encrypted content units 131-0 to 131-$j$ to which the serial numbers [0] to [j], respectively, are assigned. Meanwhile, the encrypted part 121-2 is a collection of the encrypted content units 131-$k$ to 131-N to which the serial numbers [k] to [N], respectively, are assigned. Here, j and k are integers that satisfy the following relationship: $0<j<k<N$.

Specifically, the moving source device 101 extracts, from the encrypted content 121, the encrypted content units 131-0 to 131-$j$ to which the serial numbers [0] to [j], respectively, are assigned, and copies the extracted encrypted content units 131-0 to 131-$j$ as they are, as the encrypted part 121-1, to the moving destination device 2-A together with the same identification information 122 as that of the original encrypted content 121, without the need to perform a decrypting process and a re-encrypting process in the known technique. At this time, the moving source device 101 generates content information 141-A composed of serial number information 151-A representing the serial numbers [0] to [j] and the identification information 122, and holds the generated content information 141-A within itself.

Similarly, the moving source device 101 extracts, from the encrypted content 121, the encrypted content units 131-$k$ to 131-N to which the serial numbers [k] to [N], respectively, are assigned, and copies the extracted encrypted content units 131-$k$ to 131-N as they are, as the encrypted part 121-2, to the moving destination device 2-B together with the same identification information 122 as that of the original encrypted content 121, without the need to perform the decrypting process and the re-encrypting process in the known technique. At this time, the moving source device 101 generates content information 141-B composed of serial number information 151-B representing the serial numbers [k] to [N] and the identification information 122, and holds the generated content information 141-B within itself.

As described above, the adoption of the inventive technique eliminates the need for time-consuming processes which are required in the known technique when copying the encrypted part to the moving destination at the time of moving out, i.e., a decrypting process for the original encrypted content, a re-encrypting process for generating a new encrypted content to be copied, a generation process for generating new identification information for the new encrypted content, and the like.

Figure 2:
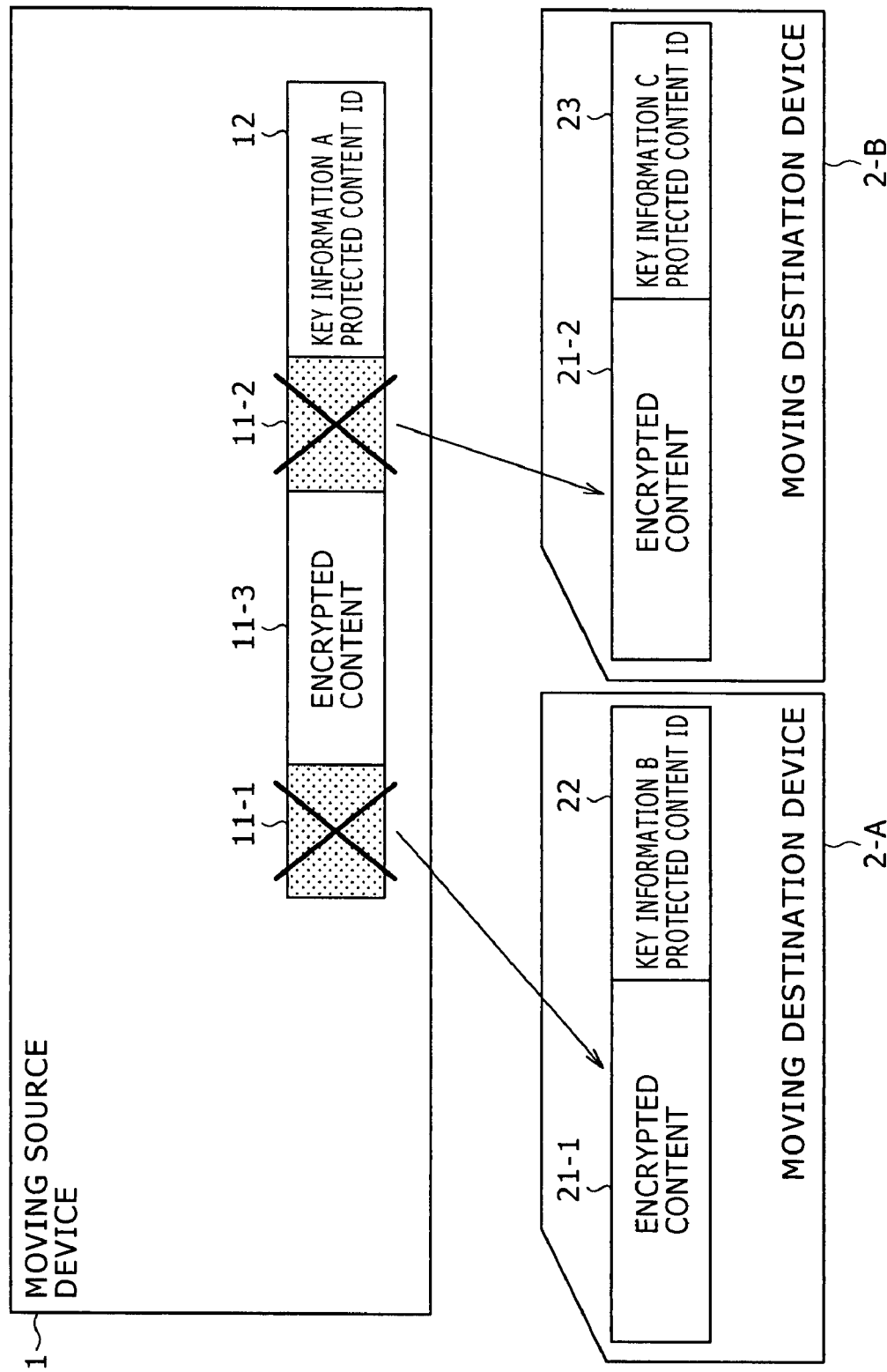
Figure 3:
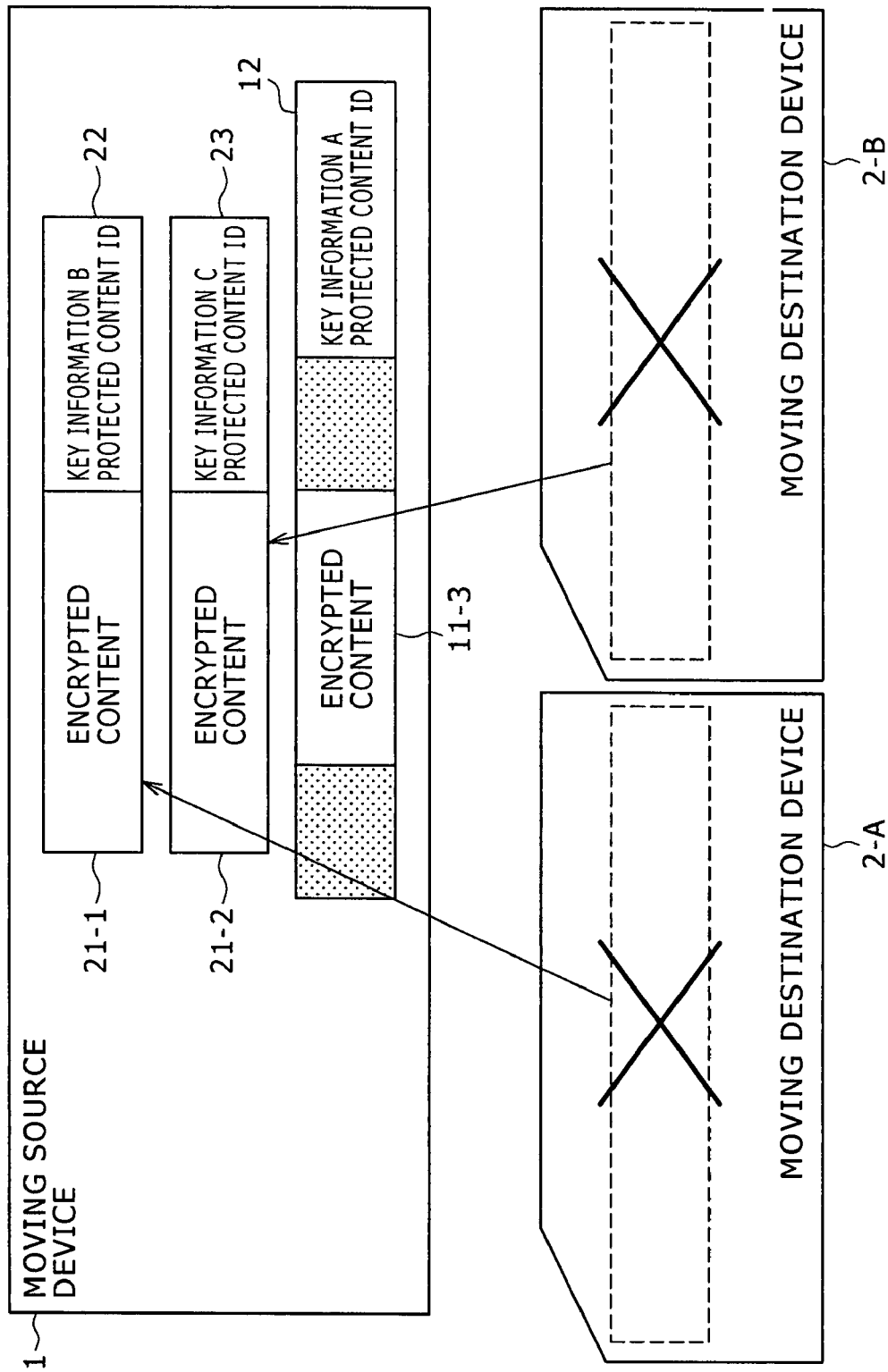
FIG. 3 is a diagram illustrating moving back according to a known technique.

Further, according to the inventive technique, deletion of the original data at the time of moving out is achieved by a simple process described below. That is, the moving source device 101 only needs to simply delete the encrypted content units 131-0 to 131-$j$ and the encrypted content units 131-$k$ to 131-N from the encrypted content. In other words, only carrying out the above deletion results in an encrypted part 121-3 being left, eliminating the need for time-consuming processes in the known technique, such as a re-encrypting process for generating an encrypted part (in the example of FIG. 2, the encrypted part 11-3) that has not been determined to be an object of moving.

As described above, the adoption of the inventive technique enables moving out of a plurality of parts in the same file using the same key (key information) as long as the objects of moving do not overlap. In other words, the adoption of the inventive technique eliminates the need for a re-encrypting process using different keys, and the like.

Still further, adoption of a technique illustrated in FIG. 7 eliminates the need for a process of deleting the original data at the time of moving out, making it possible to achieve the moving out with still simpler processing. That is, the technique illustrated in FIG. 7 is an inventive technique.

The technique illustrated in FIG. 7 is as follows. That is, instead of deleting the encrypted parts 121-1 and 121-2, which are the original data, as illustrated in FIG. 6, the moving source device 101 causes at least the encrypted parts 121-1 and 121-2 to enter an inactive state. The addition of "at least" is because the moving source device 101 may cause the entire encrypted content 121 to enter the inactive state.

The inactive state refers to an irreproducible state. In contrast, an active state refers to a reproducible state. In other words, copying the encrypted part 121-1 to the moving destination device 2-A and causing the encrypted part 121-1 to enter the active state therein while causing the encrypted part 121-1 to enter the inactive state in the moving source device 101 means transferring a "right of reproducing" the encrypted part 121-1 from the moving source device 101 to the moving destination device 2-A. Similarly, copying the encrypted part 121-2 to the moving destination device 2-B and causing the encrypted part 121-2 to enter the active state therein while causing the encrypted part 121-2 to enter the inactive state in the moving source device 101 means transferring a "right of reproducing" the encrypted part 121-2 from the moving source device 101 to the moving destination device 2-B.

In this case, the moving back is achieved only by returning the "reproducing right", without the need to move actual data of the encrypted part 121-1 or 121-2. Hereinafter, such moving back will be described with reference to FIGS. 8 to 10.

Referring to FIG. 8, in the case where the encrypted part 121-1 is moved back from the moving destination device 2-A to the moving source device 101, for example, the moving source device 101 first collates the serial number information 151-A in the content information 141-A with the serial numbers of the encrypted content units that constitute the encrypted part 121-1 in the moving destination device 2-A, and collates the identification information 122 in the content information 141-A with the identification information 122 in the moving destination device 2-A.

In the example of FIG. 8, the serial number information 151-A in the content information 141-A represents the serial numbers [0] to [j], and therefore corresponds with the serial numbers [0] to [j] of the encrypted content units that constitute the encrypted part 121-1 in the moving destination device 2-A. In addition, the identification information 122 in the content information 141-A is identical to the identification information 122 in the moving destination device 2-A. Therefore, the collation is completed successfully.

Then, referring to FIG. 9, the moving source device 101 deletes the encrypted part 121-1 and the identification information 122 from the moving destination device 2-A, and causes the encrypted content units 131-0 to 131-$j$ to which the collated serial numbers [0] to [j], respectively, are assigned, i.e., the encrypted part 121-1, to enter the active (reproducible) state.

Further, although not shown, in the case where the encrypted part 121-2 is moved back from the moving destination device 2-B, basically the same processes as the series of processes described above with reference to FIGS. 8 and 9 are performed, and as a result, the encrypted content units 131-$k$ to 131-N to which the serial numbers [k] to [N], respectively, are assigned, i.e., the encrypted part 121-2, are caused to enter the active (reproducible) state, while the encrypted part 121-2 and the identification information 122 are deleted from the moving destination device 2-B. As a result, the entire encrypted content 121 enters the reproducible state.

As noted previously, in the case where a part of the encrypted content 121 is moved out, not only that part of the encrypted content 121 but the entire encrypted content 121 may be caused to enter the inactive state. Moving back in that case may be achieved as follows. That is, until the plurality of encrypted parts moved out to the different moving destinations have all been moved back, the moving source device 101 only returns the "right of reproducing" the moved back encrypted part (range), and when all of the plurality of encrypted parts have been moved back, the moving source device 101 causes the entire encrypted content 121 to enter the active state.

Specifically, in the case where the encrypted part 121-1 has been moved out to the moving destination device 2-A and the encrypted part 121-2 has been moved out to the moving destination device 2-B as illustrated in FIG. 7, for example, the moving back is carried out in the following manner. That is, when moving back only one of the encrypted parts 121-1 and 121-2, the moving source device 101 deletes the one encrypted part from the moving destination device 2-A or 2-B, and only returns the "right of reproducing" the one encrypted part to itself. Thereafter, when moving back the other of the encrypted parts 121-1 and 121-2, as illustrated in FIG. 10, the moving source device 101 deletes the other encrypted part from the moving destination device 2-B or 2-A, and causes the entire encrypted content 121 to enter the active state.

The inventive techniques have been described above with reference to FIGS. 4 to 10. FIG. 11 is a block diagram illustrating an exemplary structure of the moving source device 101 to which the above-described inventive techniques are applied, i.e., an information processing apparatus according to one embodiment of the present invention.

The moving source device 101 as illustrated in FIG. 11 is capable of the moving out and moving back of the object of moving, such as the whole or a part of the encrypted content, held in the moving source, such as a built-in storage section 306 or an external removable medium 308, in connection with the moving destination devices 2-A and 2-B. As noted previously, the moving destination is not limited to the moving destination device 2-A or 2-B. Specifically, in the case where the moving source is the storage section 306, for example, the moving destination may be the removable medium 308.

The moving source device 101 includes a control section 301, a read only memory (ROM) 302, a random access memory (RAM) 303, a communication control section 304, a content processing section 305, the storage section 306, and a drive 307.

The control section 301 controls an overall operation of the moving source device 101. For example, the control section 301 controls operations of the content processing section 305, the communication control section 304, and the like described below. When controlling the operations, the control section 301 may perform various processes in accordance with a program stored in the ROM 302 or the storage section 306 as necessary. In the RAM 303, a program executed by the control section 301, data, and the like are stored as appropriate. In the present embodiment, for example, the above-described content information is stored in the RAM 303. Note that the content information may be stored in the storage section 306 described below.

The communication control section 304 controls communication performed with the outside. In the case of FIG. 11, for example, the communication control section 304 transmits, at the time of moving out, the object of moving provided from the content processing section 305, i.e., the encrypted content (including the encrypted part) and the identification information thereof, to the moving destination device 2-A or the moving destination device 2-B.

Meanwhile, at the time of moving back, the communication control section 304 receives the object of moving transmitted from the moving destination device 2-A or the moving destination device 2-B, i.e., the encrypted content (including the encrypted part) and the identification information thereof, and provides the object of moving received to the content processing section 305. Note that, however, in the case where the object of moving (the original data) has simply been caused to enter the inactive (irreproducible) state in the moving source without being deleted therefrom at the time of moving out, the object of moving is simply caused to return to the active (reproducible) state in the moving source at the time of moving back, and therefore, the transmission of the object of moving from the moving destination device 2-A or the moving destination device 2-B is not performed.

In addition, the communication control section 304 is capable of controlling an operation of the moving destination device 2-A or the moving destination device 2-B by transmitting a control signal (e.g., a command) provided from the control section 301 to the moving destination device 2-A or the moving destination device 2-B. For example, at the time of moving back, a delete command is issued to delete the object of moving within the moving destination device 2-A or the moving destination device 2-B.

In this case, the communication control section 304 is connected to the moving destination device 2-A or the moving destination device 2-B via a dedicated i.LINK cable, for example, to achieve the above control of communication. Here, i.LINK is a trademark of the present applicant, Sony Corporation, for the IEEE (Institute of Electrical and Electronics Engineers) 1394 high speed digital serial interface. Thus, the communication control section 304 is capable of relaying various information (e.g., the encrypted content, the control signal, etc.) exchanged between the control section 301 and the moving destination device 2-A or 2-B, or between the content processing section 305 and the moving destination device 2-A or 2-B, for example, in accordance with the IEEE 1394 standard.

Alternatively, the communication control section 304 may achieve the above control of communication using another interface, such as USB (Universal Serial Bus), instead of using i.LINK.

In addition, for example, the communication control section 304 is capable of receiving a broadcasting signal (e.g., an analog terrestrial broadcasting signal, a BS analog broadcasting signal, a digital terrestrial broadcasting signal, a BS digital broadcasting signal, etc.) and providing, as a content, a video signal of a television program obtained as a result of reception of the broadcasting signal to the content processing section 305.

In addition, for example, the communication control section 304 has a capability to connect with a network such as the Internet, and is capable of receiving-predetermined data or the like transmitted by broadcast delivery via a predetermined network, and providing the received predetermined data or the like to the content processing section 305 as the content.

The content processing section 305 is capable of performing various processes on the content. Here, the various processes include a process of converting the form of the content. Examples of the process of converting the form of the content include: an encryption process in accordance with the "encryption system in which encryption involves assignment of serial number information" for converting the non-encrypted content into the form of the encrypted content; and a process of inverse conversion, i.e., a decryption process for converting the encrypted content into the form of the non-encrypted content. Other examples of the process of converting the form of the content include: a process of encoding the content provided from the communication control section 304 in the form of the video signal in accordance with an encoding system, such as an MPEG (Moving Picture Experts Group) system, to convert the content into the form of encoded data; and a process of inverse conversion, i.e., a process of decoding the encoded data in accordance with a system corresponding to the encoding system such as the MPEG system to convert the encoded data into the form of the video signal. Other examples of the various processes include: a controlling process for writing, reading, or deleting the content to or from the storage section 306 or the removable medium 308; and a controlling process for sending and receiving of the content in connection with the communication control section 304 or the control section 301.

The storage section 306 is formed by a hard disk drive (hereinafter referred to as an HDD for short as appropriate), for example, and stores the encrypted content and the like provided from the content processing section 305. In addition, the storage section 306 allows the encrypted content and the like stored therein to be read therefrom and provided to the content processing section 305.

The drive 307 causes the encrypted content and the like provided from the content processing section 305 to be recorded on the removable medium 308. In addition, the drive 307 reads the encrypted content and the like recorded on the removable medium 308, and provides the read encrypted content and the like to the content processing section 305.

The removable medium 308 may be formed by a magnetic disk (including a flexible disk), an optical disk (including a CD-ROM (Compact Disc-Read Only Memory), a DVD (Digital Versatile Disc), and a BD (Blu-ray Disc Founders)), a magneto-optical disk (including an MD (Mini Disc)), a magnetic tape, a semiconductor memory, or the like.

Next, an example of a process (hereinafter referred to as a move-out process) performed by the moving source device 101 as illustrated in FIG. 11 for achieving the moving out in accordance with the inventive technique will be described below with reference to a flowchart of FIG. 12.

It is assumed here that contents are managed on a title-by-title basis. Each title is composed of actual video data and additional data such as metadata. The actual video data may be divided into data for reproduction and data for transfer, which are contained in the title in different forms. However, in order to simplify the description, it is assumed here that the title simply means the entire encrypted content and the identification information thereof contained in a single file. Specifically, in the case of FIGS. 4 to 10 described above, for example, the entire encrypted content 121 and the identification information 122 correspond to one title.

That is, it is assumed here that the encrypted content that is the candidate for the object of moving and the identification information thereof are stored in the moving source as a single title. Further, it is assumed that the moving source is the storage section 306. The moving destination of the object of moving is the moving destination device 2-A or 2-B, but hereinafter, the moving destination devices 2-A and 2-B will be referred to collectively as a moving destination device 2.

At step S1, the control section 301 controls the content processing section 305 to determine, within the title, a range of a part of the title to be written out to the moving destination device 2. This range will hereinafter be referred to as a written-out range. Note that the written-out range is the encrypted content unit(s) as described above. That is, the encrypted part composed of one or more encrypted content units is determined to be the "written-out range" within the title.

At step S2, the control section 301 controls the content processing section 305 to generate the content information and holds the generated content information in the RAM 303 or the like. That is, the content information composed of the serial number information representing the serial numbers of the one or more encrypted content units that constitute the "written-out range" part of the title and the identification information contained in the title is generated.

At step S3, the control section 301 controls the communication control section 304 to copy the "written-out range" part of the title to the moving destination device 2 together with the content information.

At step S4, the control section 301 determines whether or not to inactivate the entire title.

If it is determined at step S4 that the entire title should not be inactivated, the control section 301 controls the content processing section 305 to cause the "written-out range" part of the title to enter the irreproducible (inactive) state at step S5. Then, control proceeds to step S7.

Meanwhile, if it is determined at step S4 that the entire title should be inactivated, the control section 301 controls the content processing section 305 to cause the entire title to enter the irreproducible (inactive) state at step S6. Then, control proceeds to step S7.

At step S7, the control section 301 controls the communication control section 304 to cause the encrypted content in the moving destination device 2, i.e., the "written-out range" part of the title, to enter the reproducible (active) state.

Thus, the move-out process is completed.

Next, an example of a process (hereinafter referred to as a "move-back process") performed by the moving source device 101 as illustrated in FIG. 11 for achieving the moving back in accordance with the inventive technique will be described below with reference to a flowchart of FIG. 13.

At step S21, the control section 301 controls the communication control section 304 to collate the content information held in the RAM 303 or the like with information obtained from the encrypted content and the like within the moving destination device 2.

Here, the information obtained from the encrypted content and the like within the moving destination device 2 refers to the serial numbers assigned to the one or more encrypted content units that constitute the encrypted content (more accurately, the encrypted part) within the moving destination device 2, and the identification information held in the moving destination device 2 together with the encrypted content.

At step S22, the control section 301 determines whether the content information and the information collated therewith coincide with each other.

If it is determined at step S22 that the content information and the information collated therewith do not coincide with each other, the move-back process is terminated.

Meanwhile, if it is determined at step S22 that the content information and the information collated therewith coincide with each other, control proceeds to step S23.

At step S23, the control section 301 controls the communication control section 304 to delete the encrypted content and the like in the moving destination device 2. The encrypted content and the like to be deleted at this time refers to the encrypted content (more accurately, the encrypted part) within the moving destination device 2 and the identification information held in the moving destination device 2 together with the encrypted content.

At step S24, the control section 301 determines whether the entire title is in the inactive state.

In the case where the move-back process is performed after the process of step S5 in FIG. 12 described above has been performed, determination at the process of step S24 is NO, and control proceeds to step S25. At step S25, the control section 301 controls the content processing section 305 to cause a moved-back part of the title to enter the reproducible (active) state. Thus, the move-back process is completed.

Meanwhile, in the case where the move-back process is performed after the process of step S6 in FIG. 12 described above has been performed, determination at the process of step S24 is YES, and control proceeds to step S26.

At step S26, the control section 301 determines whether the moving back of the entire title has been completed.

If it is determined at step S26 that the moving back of the entire title has not been completed yet, the control section 301 controls the content processing section 305 to return the "right of reproducing" the moved-back part of the title at step S27. Thus, the move-back process is completed.

Meanwhile, if it is determined at step S26 that the moving back of the entire title has been completed, the control section 301 controls the content processing section 305 to cause the entire title to enter the reproducible (active) state at step S28. Thus, the move-back process is completed.

Note that the above-described series of processes may be implemented by either hardware or software. In the case where the series of processes is implemented by software, a program that forms the software is installed from a program storage medium into a computer having a dedicated hardware configuration, a computer that includes, as appropriate, the content processing section 305, the control section 301, and so on of the moving source device 101 as illustrated in FIG. 11 and which becomes capable of performing various functions when various programs are installed therein, a general-purpose personal computer, or the like.

Referring to FIG. 11, the program storage medium that has stored therein the program to be installed into and made executable by the computer is formed, for example, by: the removable medium 308, which is a packaged medium formed by the magnetic disk (including the flexible disk), the optical disk (including the CD-ROM (Compact Disc-Read Only Memory), and the DVD (Digital Versatile Disc)), the magneto-optical disk, or the semiconductor memory; the ROM 302 in which the program is temporarily or permanently stored; or the hard disk that forms the storage section 306. The storage of the program into the program storage medium is achieved using a wired or wireless communication medium, such as a local area network, the Internet, or digital satellite broadcasting, via the communication control section 304 as necessary.

Note that the steps implemented by the program stored in the storage medium and described in the present specification may naturally be performed chronologically in order of description but need not be performed chronologically. Some steps may be performed in parallel or independently.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a controller configured to move out a part of an encrypted content from a moving source to a moving destination by:
     generating the encrypted content comprising encrypted content units;
     assigning serial numbers to the encrypted content units;
     generating, as identification information, data necessary for identifying and making reproducible the encrypted content;
     determining a moving object range corresponding to one or more of the encrypted content units;
     holding in the moving source, as content information, the identification information and serial number information representing serial numbers assigned to the one or more of the encrypted content units;
     copying the one or more of the encrypted content units from the encrypted content, thereby forming a copy of the part of the encrypted content, the part of the encrypted content being less than an entirety of the encrypted content;
     moving the copy of the part of the encrypted content to the moving destination together with the identification information; and
     causing at least the part of the encrypted content to enter an inactive state in the moving source,
   wherein said controller is further configured to move back from the moving destination to the moving source the copy of the part of the encrypted content by:
     collating the content information held in the moving source with information obtained from the copy of the part of the encrypted content and the identification information in the moving destination,
     deleting the copy of the part of the encrypted content and the identification information from the moving destination after the collation is successfully completed, and
     after the collation is successfully completed, causing the part of the encrypted content in the moving source to enter an active state.

2. The information processing apparatus according to claim 1, wherein causing at least the part of the encrypted content to enter the inactive state in the moving source comprises causing only the part of the encrypted content to enter the inactive state in the moving source.

3. The information processing apparatus according to claim 1, wherein causing at least the part of the encrypted content to enter the inactive state in the moving source comprises causing the entirety of the encrypted content to enter the inactive state in the moving source.

4. The information processing apparatus according to claim 3, wherein said controller is further configured to move back from the moving destination to the moving source the copy of the part of the encrypted content by:
collating the content information held in the moving source with information obtained from the copy of the part of the encrypted content and the identification information in the moving destination;
after the collation is successfully completed,
deleting the copy of the part of the encrypted content and the identification information from the moving destination,
returning to the moving source a right of reproducing the part of the encrypted content, and
if the moving source has a right of reproducing the entirety of the encrypted content, causing the entirety of the encrypted content in the moving source to enter the active state.

5. The information processing apparatus according to claim 1, wherein the inactive state is an irreproducible state.

6. A computer-implemented information processing method, the method comprising:
using a controller to move out a part of an encrypted content from a moving source to a moving destination by:
generating the encrypted content comprising a plurality of encrypted content units,
assigning serial numbers to the encrypted content units,
generating, as identification information, data necessary for identifying and making reproducible the encrypted content,
determining a moving object range corresponding to one or more of the encrypted content units,
holding in the moving source, as content information, the identification information and serial number information representing serial numbers assigned to the one or more of the encrypted content units,
copying the one or more of the encrypted content units from the encrypted content, thereby forming a copy of the part of the encrypted content, the part of the encrypted content being less than an entirety of the encrypted content,
moving the copy of the part of the encrypted content to the moving destination together with the identification information, and
causing at least the part of the encrypted content to enter an inactive state in the moving source; and
using said controller to move back from the moving destination to the moving source the copy of the part of the encrypted content by:
collating the content information held in the moving source with information obtained from the copy of the part of the encrypted content and the identification information in the moving destination,
deleting the copy of the part of the encrypted content and the identification information from the moving destination after the collation is successfully completed, and
after the collation is successfully completed, causing the part of the encrypted content in the moving source to enter an active state.

7. A non-transitory computer-readable medium in which a program is stored, the program being executable by a computing system to cause the computing system to move out a part of an encrypted content from a moving source to a moving destination, the moving out comprising:
generating the encrypted content comprising encrypted content units;
assigning serial numbers to the encrypted content units;
generating, as identification information, data necessary for identifying and making reproducible the encrypted content;
determining a moving object range corresponding to one or more of the encrypted content units;
holding in the moving source, as content information, the identification information and serial number information representing serial numbers assigned to the one or more of the encrypted content units;
copying the one or more of the encrypted content units from the encrypted content, thereby forming a copy of the part of the encrypted content, the part of the encrypted content being less than an entirety of the encrypted content;
moving the copy of the part of the encrypted content to the moving destination together with the identification information; and
causing at least the part of the encrypted content to enter an inactive state in the moving source,
wherein the program is further executable by the computing system to cause the computing system to move back from the moving destination to the moving source the copy of the part of the encrypted content by:
collating the content information held in the moving source with information obtained from the copy of the part of the encrypted content and the identification information in the moving destination,
deleting the copy of the part of the encrypted content and the identification information from the moving destination after the collation is successfully completed, and
after the collation is successfully completed, causing the part of the encrypted content in the moving source to enter an active state.

8. The information processing apparatus according to claim 1, wherein said controller is configured to decrypt subsets of the encrypted content units independently of each other.

* * * * *